United States Patent
Fukasawa (10) Patent No.: US 8,281,330 B2
(45) Date of Patent: Oct. 2, 2012

(54) DISK APPARATUS

(75) Inventor: Akihiro Fukasawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 356 days.

(21) Appl. No.: 12/442,688

(22) PCT Filed: Feb. 21, 2007

(86) PCT No.: PCT/JP2007/053146
§ 371 (c)(1),
(2), (4) Date: Mar. 24, 2009

(87) PCT Pub. No.: WO2008/041373
PCT Pub. Date: Apr. 10, 2008

(65) Prior Publication Data
US 2010/0011386 A1    Jan. 14, 2010

(30) Foreign Application Priority Data
Oct. 4, 2006   (JP) .................................. 2006-272860

(51) Int. Cl.
*G11B 7/00*   (2006.01)
(52) U.S. Cl. ........................................................ 720/692
(58) Field of Classification Search .................. 720/692
See application file for complete search history.

(56) References Cited

U.S. PATENT DOCUMENTS

| | | | |
|---|---|---|---|
| 6,125,097 | A | 9/2000 | Wu |
| 6,690,638 | B1 | 2/2004 | Kiyomiya et al. |
| 2003/0035362 | A1 | 2/2003 | Akimaru et al. |
| 2004/0047277 | A1 | 3/2004 | Kiyomiya et al. |
| 2005/0210482 | A1 | 9/2005 | Amitani |
| 2005/0216927 | A1 | 9/2005 | Amitani |
| 2005/0289574 | A1 | 12/2005 | Yamauchi et al. |

FOREIGN PATENT DOCUMENTS

| | | |
|---|---|---|
| CN | 2604760 Y | 2/2004 |
| JP | 11-328944 A | 11/1999 |
| JP | 2001-355670 A | 12/2001 |
| JP | 2003-7033 A | 1/2003 |
| JP | 2004-134045 A | 4/2004 |
| JP | 2004-319005 A | 11/2004 |
| JP | 2006-12292 A | 1/2006 |

*Primary Examiner* — Hoai V Ho
*Assistant Examiner* — Pablo Huerta
(74) *Attorney, Agent, or Firm* — Birch, Stewart, Kolasch & Birch, LLP

(57) ABSTRACT

A vibration-damping mechanism for the drive chassis is configured in such a manner that insulators each are placed in at least three respective predetermined positions of a drive chassis on which a motor and an optical pickup unit are mounted, and a weight plate is floatingly and movably supported on the drive chassis by way of the insulators, wherein the shape of the weight plate is determined based on a predetermined vibration-damping frequency, the at least three respective predetermined positions, and a spring constant of the insulators which are identical to each other.

2 Claims, 9 Drawing Sheets

DISK APPARATUS

TECHNICAL FIELD

The present invention relates to a disk apparatus used for recording information onto and/or playing that back from a discoid recording medium such as an optical disk or a magneto-optical disk, and, in particular, to a disk apparatus including a vibration-damping mechanism that curbs vibrations caused by a high-speed rotation of the disk to a drive chassis on which a record-playback unit is mounted.

BACKGROUND ART

As to a disk apparatus using such an optical disk or a magneto-optical disk, mounted on a drive chassis are a spindle motor that rotates a turntable, and an optical pickup unit that is a record-playback unit, whereby an optical disk that is a discoid recording medium placed on the turntable is rotationally driven by the spindle motor at high speed. Under this situation, the optical pickup unit performs, while tracking the optical disk, recording digital information onto the optical disk, or playing back recorded digital-information therefrom.

When an optical disk rotates at high speed, due to eccentricity of the center of gravity of the optical disk itself, vibrations are generated in directions perpendicular to the axial direction of the spindle motor. The vibrations are transferred to the optical pickup unit by way of the drive chassis, resulting in causing vibrations to the optical pickup unit as well.

On this occasion, when phase deviation is generated between vibrations of the spindle motor and vibrations of the optical pickup unit, bad influence is exerted on a tracking servomechanism of a light beam focused by an objective lens of the optical pickup unit, resulting in an occurrence of errors in writing digital information onto and/or reading that from the optical disk.

In consequence, generation of vibrations of a drive chassis causes a critical problem in a high-density optical disk such as DVD (digital versatile disc) because of significant degradation in recording and/or playing back performance for digital information.

To this end, in order to curb vibrations of a drive chassis that are caused by eccentricity of the gravity-center of an optical disk itself or by vibrations from outside in a conventional disk apparatus, a vibration-damping mechanism that is referred to as "dynamic damper" has been adopted to be mounted.

As to the vibration-damping mechanism, a weight plate is mounted by way of a plurality of elastic members onto the drive chassis for which the vibrations are required to be curbed, and the weight plate is made floatingly and movably supported as far as it counteracts the elastic force attributed to the elastic members.

Excitation force according to the rotation of an optical disk having eccentricity of the center of gravity acts in the directions parallel to the optical-disk's main surface having the rotational center of the optical disk in its plane of revolution. Therefore, in regard to vibrations of the drive chassis in tracking directions caused by the excitation force, causing the weight plate to vibrate in an orientation opposing to that of the vibrations of the drive chassis makes it possible to cancel out, by the mass of the weight plate, the vibrations of the drive chassis in the tracking directions.

Similarly, in regard to vibrations of the drive chassis in directions perpendicular to the tracking directions in the plane of revolution of the optical disk, it is possible to cancel out such vibrations of the drive chassis by causing the weight plate to vibrate in an orientation opposing to that of the vibrations.

To this end, the weight plate constituting a conventional vibration-damping mechanism is so arranged as to curb the vibrations of the drive chassis in the two mutually orthogonal directions parallel to the main surface of an optical disk, under the condition that a spring constant of the elastic members for the vibration-damping mechanism and the mass of the weight plate are set so that the vibration-damping mechanism's natural-vibration frequencies of natural-vibration modes each in two directions in the plane of revolution of the optical disk are made coincident with a so-called vibration-damping frequency that is the vibration frequency of the drive chassis having the vibrations which should be curbed (for example, refer to Patent Document 1).

[Patent Document 1] Japanese Patent Application Publication No. 2003-7033 (Pages 2 and 3, FIG. 27).

DISCLOSURE OF THE INVENTION

Problems to be Solved by the Invention

By the way, in such a conventional disk apparatus described above, it is possible to substantially dampen vibrations of the drive chassis in the plane of revolution parallel to the main surface of an optical disk, and in directions parallel to the line connecting between the rotational center of the optical disk and the gravity-center position of the weight plate constituting the vibration-damping mechanism. However, it is not possible to substantially dampen against vibrations of the drive chassis in the plane of revolution parallel to the main surface of the optical disk and in directions perpendicular to the line, resulting in bad influence exerted on a tracking servomechanism of a light beam focused by an objective lens of the optical pickup unit, causing a problem in that errors occur in writing digital information onto and/or reading that from the optical disk.

Note that, in the conventional disk apparatus as described above, when the placement of a spindle motor and the optical pickup unit mounted on the drive chassis is made so that the directions parallel to the line connecting between the rotational center of the optical disk and the gravity-center position of the weight plate constituting the vibration-damping mechanism are parallel to tracking directions of the optical disk, the vibrations in the tracking directions can be curbed by the conventional vibration-damping mechanism.

However, the drive chassis is fixed onto a casing of the disk apparatus by way of a main chassis, resulting in causing vibrations to an electric circuit board or the like mounted on the casing, due to the vibrations of the drive chassis in directions perpendicular to the tracking directions. Therefore, the vibrations of the electric circuit board or the like are turned back to the optical pickup unit, eventually causing a problem in an occurrence of errors in writing digital information onto and/or reading that from the optical disk.

The present invention has been directed at solving those problems described above, and an object of the invention is to provide a disk apparatus that includes a vibration-damping mechanism capable of curbing vibrations due to eccentricity of the gravity-center of a discoid recording medium, caused to a drive chassis on which mounted are a motor for rotationally driving the discoid recording medium, and a record-playback unit for recording a digital signal onto and/or playing that back from the discoid recording medium.

Means for Solving the Problems

A disk apparatus according to the present invention comprises: a motor for rotationally driving a discoid recording medium; a record-playback unit for recording a digital signal onto and/or playing that back from the discoid recording medium; a drive chassis on which the motor and the record-playback unit are fastened; elastic members placed in at least three respective predetermined positions of the drive chassis; and a weight plate floatingly and movably supported on the drive chassis by way of the elastic members; wherein the shape of the weight plate is determined based on a vibration-damping frequency for the drive chassis, the at least three respective predetermined positions, and a spring constant of the elastic members which are identical to each other.

EFFECTS OF THE INVENTION

According to the present invention, the shape of the weight plate is determined based on the vibration-damping frequency at which vibrations are intended to be dampened, the at least three respective predetermined positions of a drive chassis, and the spring constant of the elastic members which are identical to each other, so that such an effect can be achieved as curbing the vibrations which are due to the eccentricity of the gravity-center of a discoid recording medium, caused to the drive chassis on which the motor and the record-playback unit are mounted.

EXPLANATION OF NUMERALS AND SYMBOLS

"1" designates a drive chassis; "2," spindle motor; "4," optical disk; "5," optical pickup unit; "10," weight plate; "11," insulators 11; "13," weight plate; "14a," material particle; "14b," material particle; "14c," material particle; "14d," rigid-body link; "14e," rigid-body link; "14f," rigid-body link; "15a," spring elements; "15b," spring elements; and "15c," spring elements.

BEST MODE FOR CARRYING OUT THE INVENTION

In what follows, the explanation will be made for embodiments of a disk apparatus according to the present invention in which a discoid recording medium is an optical disk and a record-playback unit is an optical pickup unit, for example. Embodiment 1.

Figure 1:
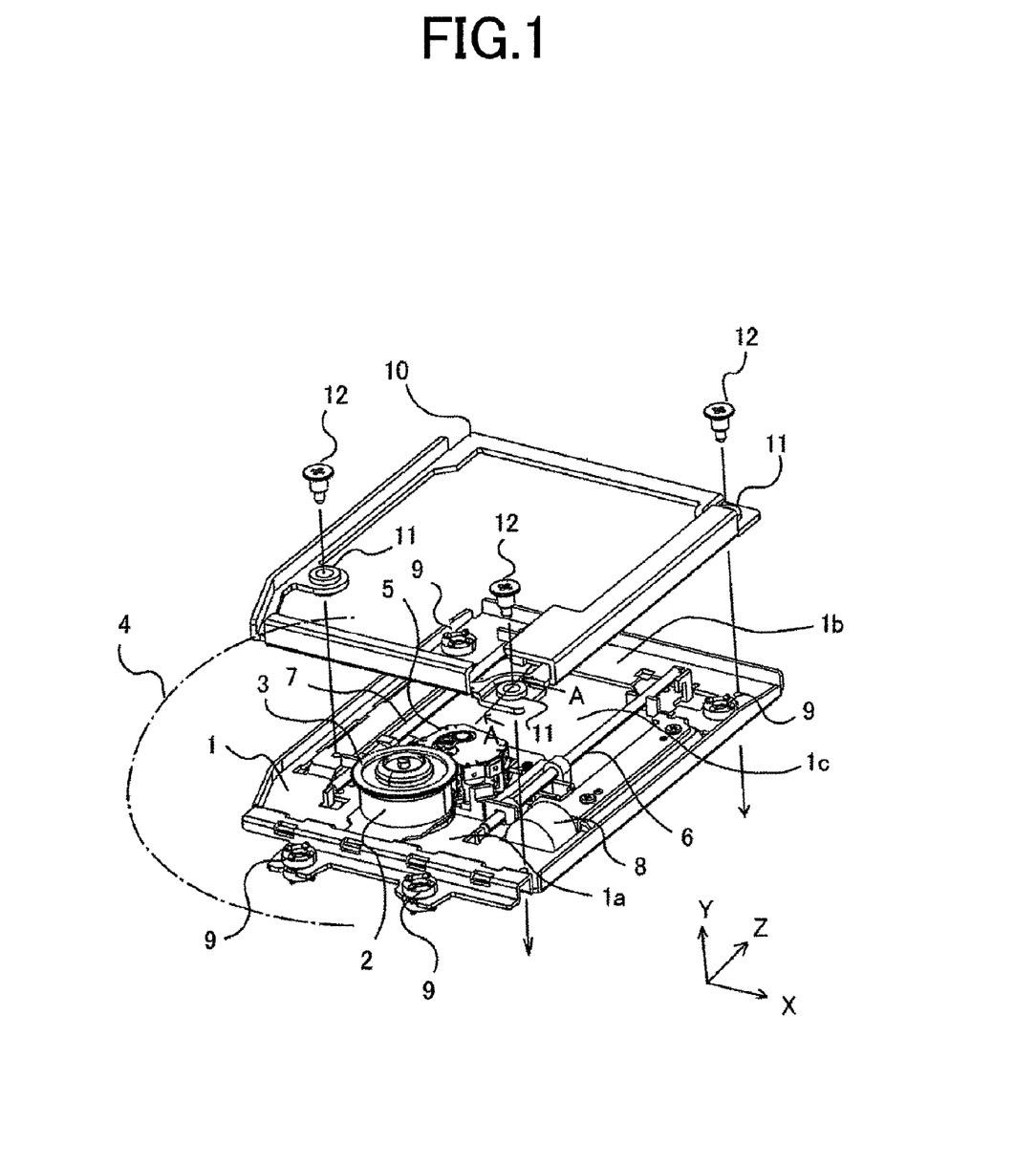
FIG. 1 is a diagram for collectively illustrating an overall configuration of a disk apparatus in Embodiment 1 according to the present invention.

FIG. 1 is a diagram for collectively illustrating an overall configuration of a disk apparatus in Embodiment 1 according to the present invention. A direction parallel to movement directions of the optical pickup unit for tracking is defined as a Y-axis direction, an orthogonal direction to the Y-axis in the main surface of the optical disk, an X-axis direction, and a direction orthogonal or perpendicular to the main surface of the optical disk, a Z-axis direction.

In FIG. 1, a spindle motor 2 is upwardly mounted approximately in the middle of a front end-portion 1a of a drive chassis 1 that is made from a formed sheet-metal or the like. The axis of rotation of the spindle motor 2 is arranged to have an orientation perpendicular to the plane of the drive chassis 1. An optical disk 4 that is a discoid recording medium (shown by alternate long and short dashed lines) is horizontally placed onto a turntable 3 that rotates integrally with the spindle motor 2, and thus the optical disk 4 is made rotationally driven at a high speed by means of the spindle motor 2.

Meanwhile, the optical pickup unit 5 that is a record-playback unit is mounted inside an approximately rectangular aperture that is formed between the front end-portion 1a and a rear end-portion 1b of the drive chassis 1. While being guided by a guide shaft 6 and a guide shaft 7 mounted on the top face of the drive chassis 1 in parallel with each other, the optical pickup unit 5 having an upwardly directed objective lens is slidingly driven by a thread drive mechanism 8 along Y-axis directions that are the tracking directions of the optical disk 4.

Tracking is performed using a light beam focused by an objective lens of the optical pickup unit 5 onto a digital-signal recording side that is the bottom face of the optical disk 4 rotationally driven at a high speed, so that digital information is recorded onto the optical disk 4 and/or recorded digital-information is played back from the optical disk 4.

Meanwhile, insulators 9, made of rubber, being elastic members are mounted to the right and left, one pair each and four in total, on the front end-portion 1a and the rear end-portion 1b of the drive chassis 1. The insulators 9 have the function to curb vibrations coming from outside of the disk apparatus that are supposed to be transferred to the drive chassis 1. The insulators 9 are formed from, for example, butyl rubber that has a relatively large attenuation coefficient.

The rear end-portion 1b of the drive chassis 1 is fixed by way of two out of these four insulators 9 onto a main chassis (not shown in the figure) that is fixed onto a casing of the optical disk apparatus. Meanwhile, the front end-portion 1a of the drive chassis 1 is fixed by way of two out of these four insulators 9 onto an elevation drive member (not shown in the figure) that is used when loading/unloading the optical disk onto/from the turntable 3. The front end-portion 1a of the drive chassis 1 is allowed to cause a lifting up/down actuation by the elevation drive member (not shown in the figure).

Next, a vibration-damping mechanism provided to curb vibrations of the drive chassis 1 is constituted of a weight plate 10 that is made from a formed sheet-metal or the like and is approximately as large as the drive chassis 1 in its outer dimensions, and three insulators 11, made of rubber, that are elastic members.

As shown in FIG. 1, the weight plate 10 is planar and has a shape almost like a picture frame, and is fixed onto the drive chassis 1 so as to be supported parallel thereto by way of three flanged setscrews 12 through the respective three insulators 11.

Figure 2:
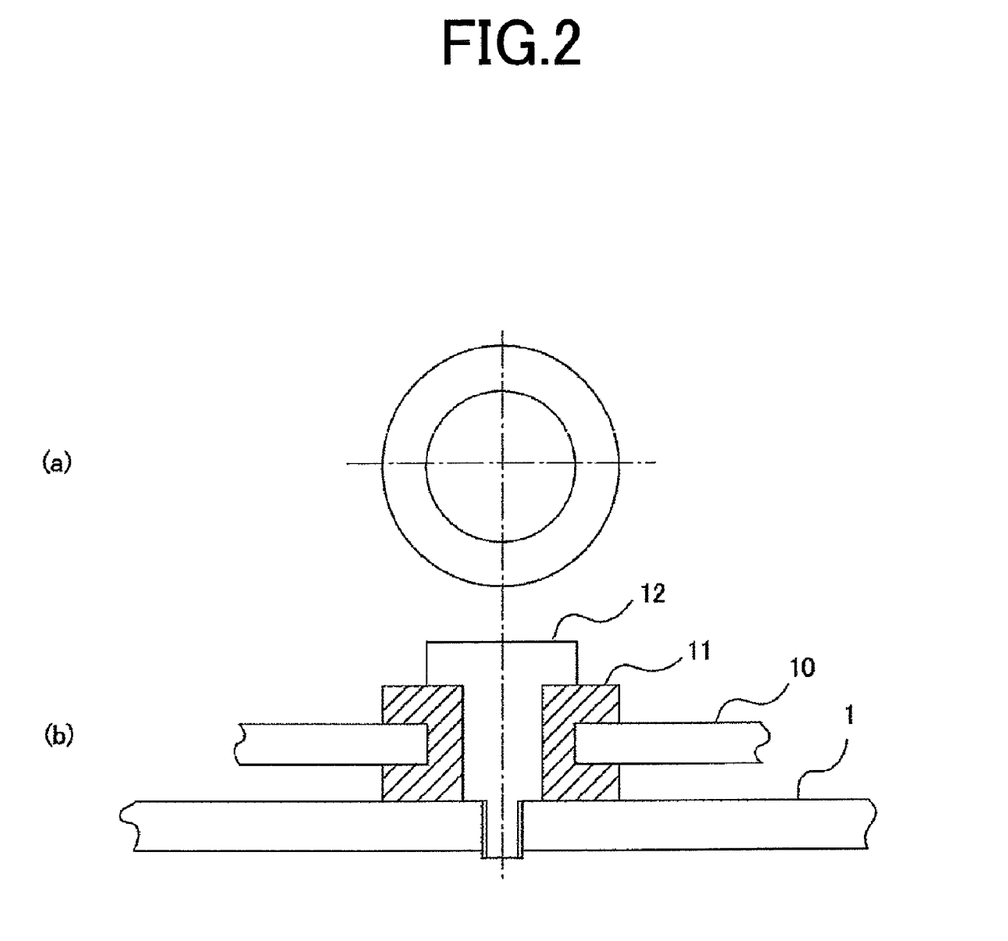
FIG. 2 is an illustrative diagram for explaining in more detail a state in which a weight plate 10 of the disk apparatus in Embodiment 1 according to the present invention is fixed onto a drive chassis 1 by way of insulators 11 each by set-screws 12.

FIG. 2 is an illustrative diagram which shows a cross-section viewed along the arrows A-A of FIG. 1, for explaining in more detail a state in which the weight plate 10 of the disk apparatus in Embodiment 1 according to the present invention is fixed onto the drive chassis 1 by way of the insulators 11 each using the setscrews 12. The same reference numerals and symbols designate the same items as or the items corresponding to those shown in FIG. 1; thus, their explanation is omitted.

The weight plate 10 is floatingly and movably fixed by the setscrews 12 onto the drive chassis 1 by way of the insulators 11 that are the elastic members. Namely, although elastic force of the insulators 11 each applied to the weight plate 10, acts against the drive chassis 1, as far as the plate can counteract the elastic force, the weight plate 10 is capable of moving in individual directions.

As to the insulators 11 that are the elastic members used for the vibration-damping mechanism, that having relatively small attenuation coefficient, for example, silicone rubber, is used in order to increase inertia force when vibrations of the drive chassis 1 and vibrations of the weight plate 10 produce resonance with each other. A vibration-damping capability can be enhanced by selecting the elastic members that have a relatively small attenuation coefficient.

Next, the shape of such a weight plate for constituting the vibration-damping mechanism will be explained in more detail.

Figure 3:
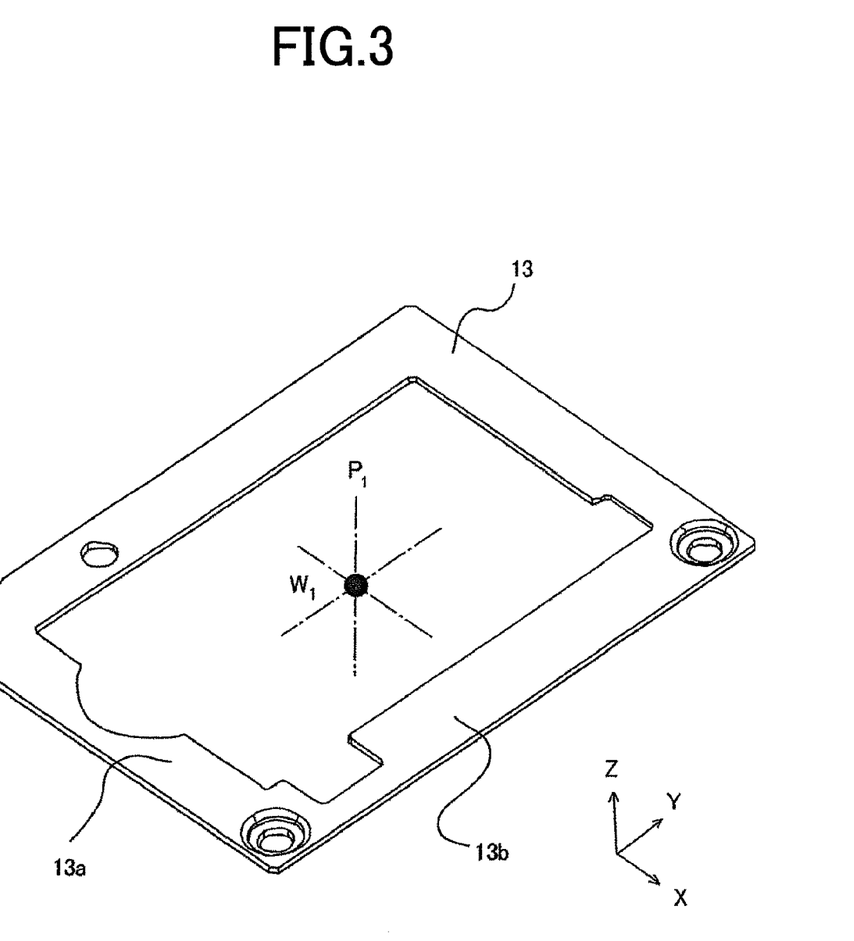
FIG. 3 is a perspective view showing an example of a weight plate 13 of a vibration-damping mechanism used in a conventional disk apparatus.

FIG. 3 is a perspective view showing an example of a weight plate 13 of a vibration-damping mechanism used in a conventional disk apparatus; the weight plate 13 of which provides, except for difference in vibration-damping capability, similar functions to those of the weight plate 10 in Embodiment 1 shown in FIG. 1 according to the present invention. "$W_1$" indicates the gravity-center position of the weight plate 13. In addition, "$P_1$" indicates the axis that passes through the gravity-center position $W_1$ in directions perpendicular to the plane of revolution of the optical disk 4.

Here, the conventional weight plate 13 is given to 60 g in weight because the mass from 50 to 60 g is generally used therefore. The gravity-center position $W_1$ of the weight plate 13 is positioned as shown in FIG. 3, at around the center position of a front end-portion 13a of the weight plate 13, and also at around the center position of a lateral end-portion 13b thereof. As a result, the gravity-center position $W_1$ of the weight plate 13 is arranged that, with respect to the rotational center of the disk 4 that is the source position of excitation force due to eccentricity of the gravity-center of the disk 4, its displacement in the X-axis direction is approximately zero, and in the Y-axis direction is in the order of 30 to 40 mm.

For a vibration-damping mechanism of the disk apparatus, as shown in FIG. 1, but having the conventional weight plate 13 in place of the weight plate 10 in Embodiment 1 according to the present invention, vibrations caused by the eccentricity of the gravity-center of the optical disk 4 has been evaluated. On this occasion, the quantity of eccentricity in rotation is given to 5 g·mm as the term of eccentricity of the gravity-center of the optical disk.

Note that, used in the vibration analysis is ADAMS (registered trademark) that is commercially-available three-dimensional mechanism-analysis software produced by MSC Software Corporation; however, it is not necessarily limited to the software, but generally-available software capable of a vibration analysis may be used for.

Figure 4:
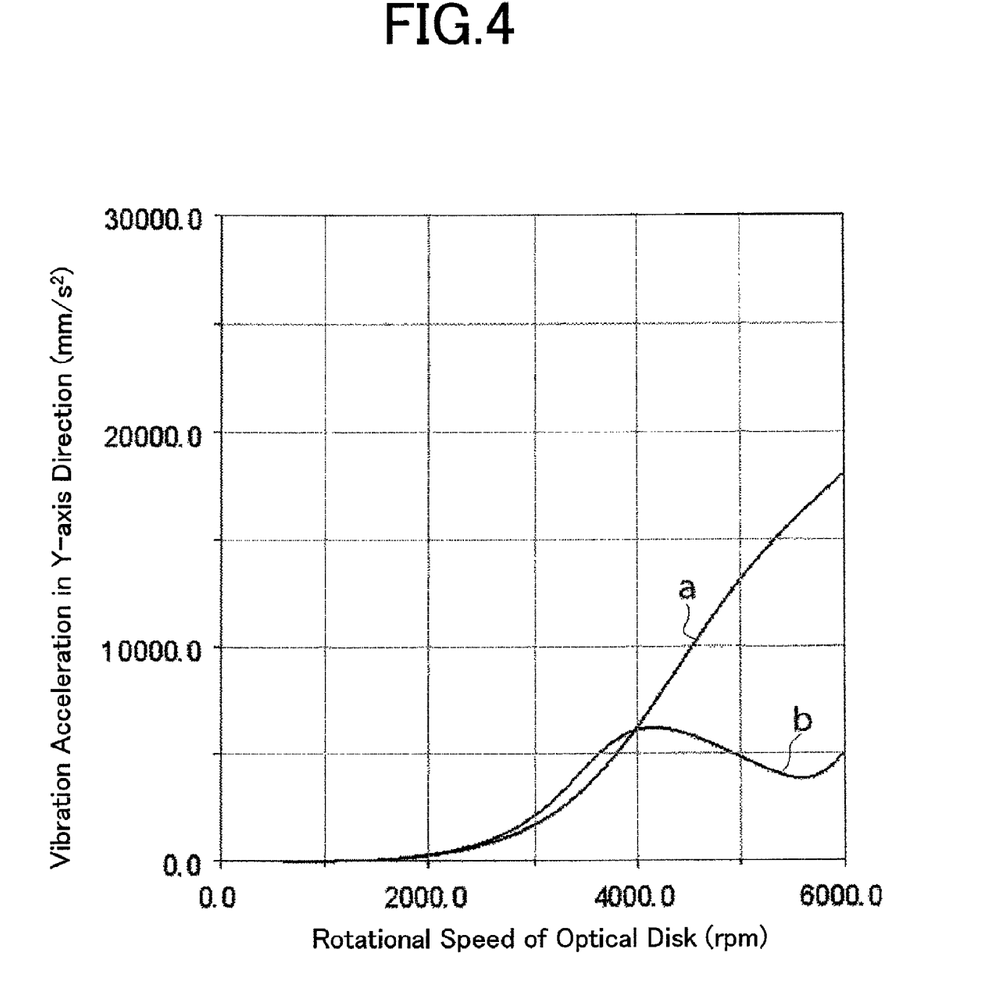
FIG. 4 is an evaluation diagram of vibration analysis showing the evaluation result of the vibration analysis in a Y-axis direction of the disk apparatus that includes the vibration-damping mechanism having the conventional weight plate 13 mounted therefore.

FIG. 4 is an evaluation diagram of vibration analysis showing the evaluation result of the vibration analysis in a Y-axis direction of the disk apparatus that includes the vibration-damping mechanism having the conventional weight plate 13 mounted therefore. The horizontal axis denotes a rotational speed of an optical disk, and the vertical axis, vibration acceleration of the drive chassis 1 in the Y-axis direction. In addition, the curve "a" indicates a case in which the vibration-damping mechanism is not provided, and the curve "b," a case including the vibration-damping mechanism with the conventional weight plate 13 mounted therein.

Now, as is known from FIG. 4, although there is a trend in which the higher a rotational speed is, the larger the vibration acceleration in the Y-axis direction becomes, comparing the curve "a" with the curve "b" reveals that vibrations at the high rotational speed are substantially curbed by providing the vibration-damping mechanism having the conventional weight plate 13 mounted therefore.

Figure 5:
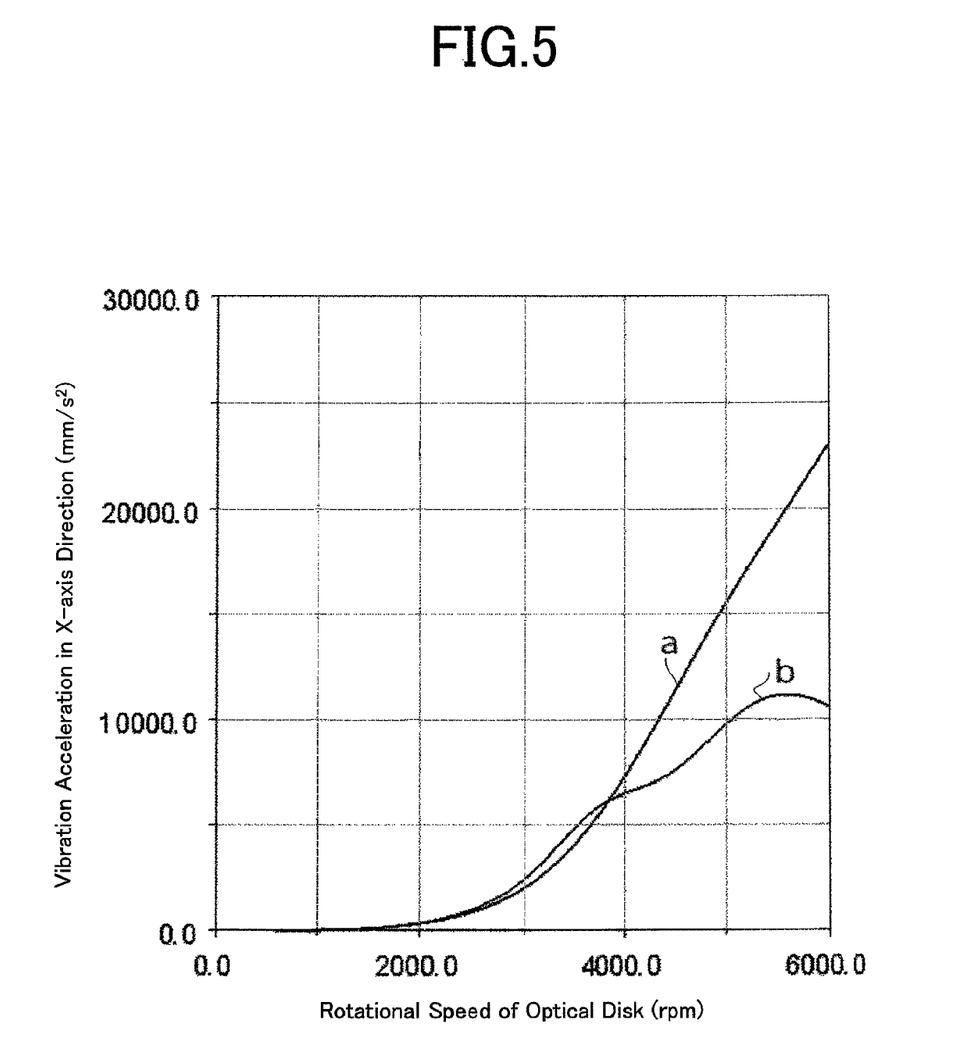
FIG. 5 is an evaluation diagram of vibration analysis showing the evaluation result of the vibration analysis in an X-axis direction of the disk apparatus that includes the vibration-damping mechanism having the conventional weight plate 13 mounted therefore.

Next, FIG. 5 is an evaluation diagram of vibration analysis showing the evaluation result of the vibration analysis in an X-axis direction of the disk apparatus that includes the vibration-damping mechanism having the conventional weight plate 13 mounted therefore. The horizontal axis denotes a rotational speed of an optical disk, and the vertical axis, vibration acceleration of the drive chassis 1 in the X-axis direction. In addition, similarly to FIG. 4, the curve "a" indicates a case in which the vibration-damping mechanism is not provided, and the curve "b," a case including the vibration-damping mechanism with the conventional weight plate 13 mounted therein.

Differing from the case in FIG. 4, as is known from FIG. 5, even if the vibration-damping mechanism with the conventional weight plate 13 mounted therein is provided, vibrations at a high rotational speed cannot be substantially curbed as compared with the case in which the vibration-damping mechanism is not provided.

As described above, in the vibration-damping mechanism with the conventional weight plate 13 mounted therein, vibration curbing effects are different in the X-axis direction and in the Y-axis direction; i.e., although vibrations can be substantially curbed in the Y-axis direction, vibrations cannot be substantially curbed in the X-axis direction. The reason is considered to be due to a large displacement of the rotational center of the optical disk 4 and the gravity-center position $W_1$ of the weight plate 13 in relation to the X-axis direction.

Note that, although it may be understood that, if the rotational center of the optical disk 4 and the gravity-center position $W_1$ of the weight plate 13 could be arranged as coincident with each other, a vibration curbing effect can be obtained also in the X-axis direction, it is necessary to mount to include other mechanisms such as a disk loading mechanism within a limited space usually in usual and general disk apparatus, and thus, it is exceedingly difficult to make the coincident arrangement under these design constraints.

Moreover, if at all, dimensions of the weight plate 13 are lowered, positional constrains are to be mitigated; however, on the contrary, because the mass of the weight plate 13 is reduced, an effect in reducing the excitation force due to inertia force of the weight plate 13 is to be degraded, so that a substantial vibration-damping effect cannot be obtained.

Figure 6:
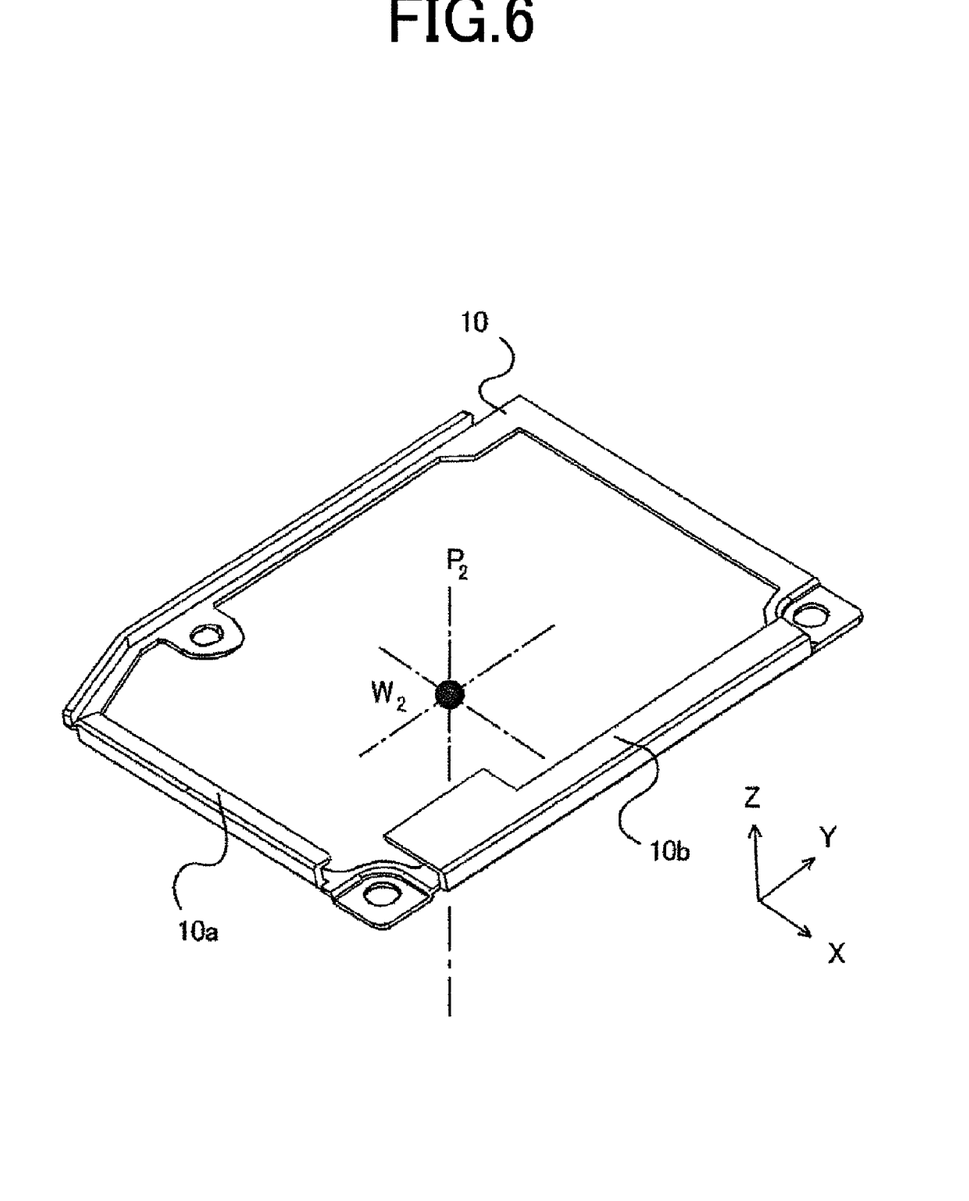
FIG. 6 is a perspective view showing in more detail the shape of a weight plate 10 of the disk apparatus in Embodiment 1 according to the present invention.

FIG. 6 is a perspective view showing in more detail the shape of the weight plate 10 of the disk apparatus in Embodiment 1 according to the present invention. "$W_2$" indicates the gravity-center position of the weight plate 10. In addition, "$P_2$" indicates the axis that takes the directions perpendicular to the plane of revolution of the optical disk 4, and passes through the gravity-center position $W_2$ of the weight plate 10.

The weight plate 10 in the shape of a picture frame has a mass of 60 g, the gravity-center position of which is placed, as shown in FIG. 6, as shifted to some extent from the center of a front end-portion 10a of the weight plate 10, but at the center position of a lateral end-portion 10b thereof.

As to the weight plate 10, the explanation will be made in more detail below. The shape of the weight plate 10 is determined that, when the weight plate is mounted on the drive chassis 1 by way of the insulators 11, natural-vibration frequencies of translational modes each of two orthogonal axes on the X-Y plane that pass through the gravity-center position $W_2$ of the weight plate 10, and natural-vibration frequencies of rotational modes each about an axis $P_2$ that is parallel to the Z-axis and in the same way passes through the gravity-center position $W_2$, are made coincident with a so-called vibration-damping frequency that is the vibration frequency in which vibrations of the drive chassis 1 are required to be curbed.

By the way, as are known from FIG. 4 and FIG. 5, there is a trend in which the higher a rotational speed of an optical disk is, the larger vibrations of the drive chassis in the X-axis direction and the Y-axis direction become. To this end, it is desirable to make a vibration-damping frequency coincident with a frequency corresponding to a maximum rotational speed of the optical disk 4 in the disk apparatus. Namely, this is because, for example, when the rotational speed of the optical disk 4 is 6000 rpm, which is the rotation of 100 revolutions per one second, resulting in strongly exciting vibrations of 100 Hz.

Figure 7:
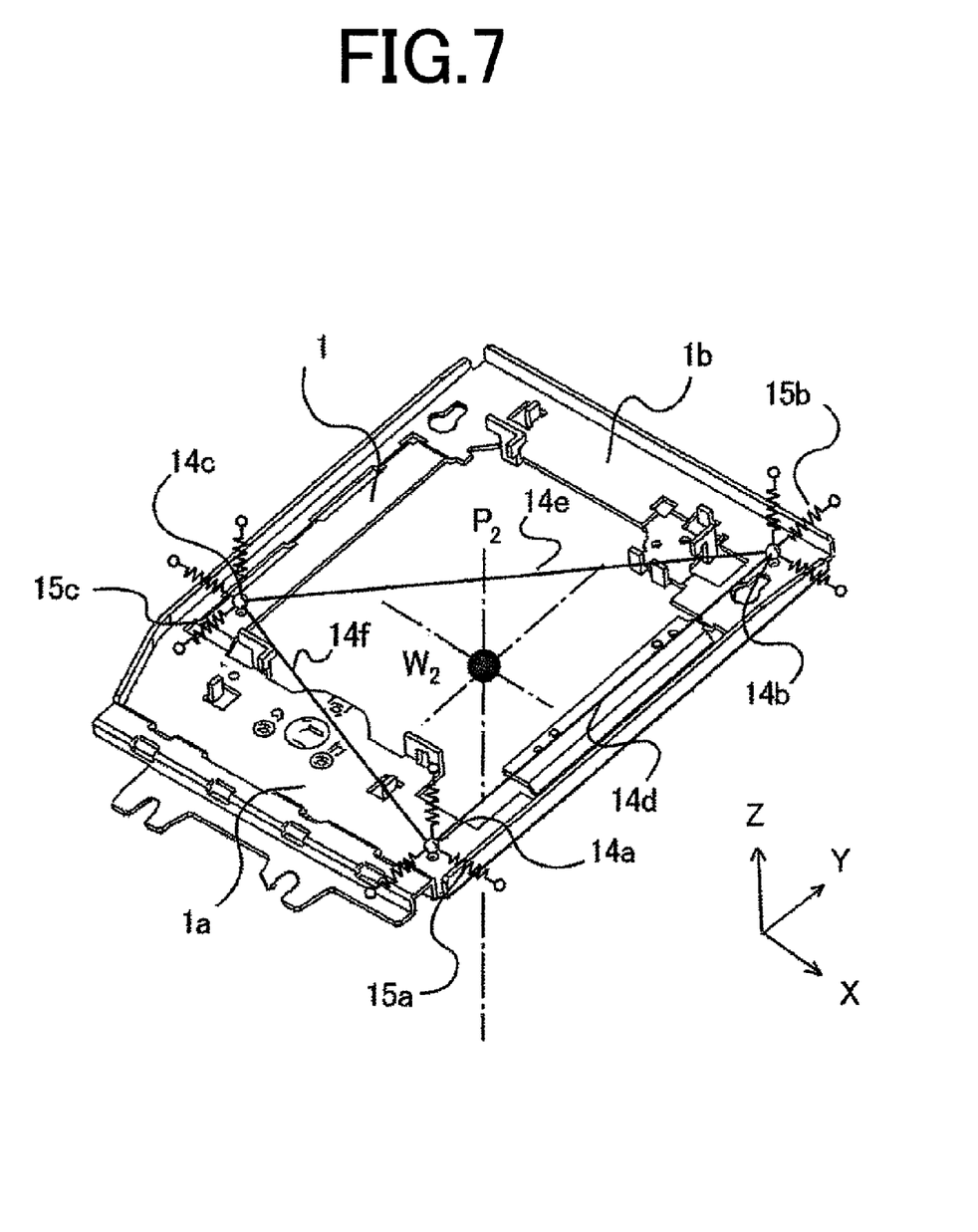
FIG. 7 is a model diagram showing an equivalent model of a vibration-damping mechanism of the disk apparatus in Embodiment 1 according to the present invention.

FIG. 7 is a model diagram showing an equivalent model of a vibration-damping mechanism of the disk apparatus in Embodiment 1 according to the present invention. The same reference numerals and symbols designate the same items as or the items corresponding to those shown in FIG. 1, FIG. 2 and FIG. 6; thus, their explanation is omitted.

In FIG. 7, the weight plate 10 is modeled by using three material particles composed of a material particle 14a, a material particle 14b and a material particle 14c, and three rigid-body links composed of a rigid-body link 14d, a rigid-body link 14e and a rigid-body link 14f. Note that, the plane of which the three material particles 14a, 14b and 14c form is made parallel to the plane of revolution of the optical disk 4; therefore, the axis $P_2$ shown in FIG. 6 is the same as the axis $P_2$ shown in FIG. 7.

The three insulators 11, i.e. the elastic members, are individually modeled, in FIG. 7, as sets of triaxial spring elements that floatingly and movably support each of the material particles constituting the equivalent model of the weight plate 10 in three respective predetermined positions of the drive chassis 1; thereby, spring elements 15a correspond to the material particle 14a, spring elements 15b, to the material particle 14b, and spring elements 15c, to the material particle 14c.

When the mass of the weight plate 10 is given as "m," the mass m is equally distributed to the three material particles 14a, 14b and 14c. Namely, the equally distributed mass to the material particles 14a, 14b and 14c is set to give m/3 each. As a result, the gravity-center position $W_2$ of the weight plate 10 is equivalent to the gravity-center position where the equally distributed masses to the material particles 14a, 14b and 14c determine.

These material particles 14a, 14b and 14c are coupled with each other by the rigid-body link 14d, the rigid-body link 14e and the rigid-body link 14f, and are further joined in the three respective predetermined positions of the drive chassis 1 by the triaxial spring elements 15a, spring elements 15b and spring elements 15c each having mutually the same spring constant.

As described above, the equivalent model of the vibration-damping mechanism for the drive chassis 1 shown in FIG. 7 is constituted of the equivalent model of the weight plate 10 with which the material particles 14a, 14b and 14c are coupled each other by the rigid-body link 14d, the rigid-body link 14e and the rigid-body link 14f, and the equivalent model of the insulators 11 expressed by the spring elements 15a, the spring elements 15b and the spring elements 15c for individually joining each of the material particles in the three respective predetermined positions of the drive chassis 1.

In the equivalent model of the vibration-damping mechanism in FIG. 7, translational vibration modes each on three axes of the X-axis, the Y-axis and the Z-axis that pass through the gravity-center position $W_2$, and rotational vibration modes each about three principal axes of inertia that in the same way pass through the gravity-center position $W_2$, are produced to have the same frequency. That is to say, six degrees of freedom for a natural-vibration frequency $f_0$ at the gravity-center position $W_2$ are all coincident with each other.

Note that, with reference to the natural-vibration frequency $f_0$, when a total sum of the equally distributed mass to three material particles 14a, 14b and 14c, namely, the mass of the weight plate 10 is given as "m," and a total sum of three spring constants with respect to the three sets of each spring elements 15a, spring elements 15b and spring elements 15c is given as "K," next Equation (1) is held:

$$f_0 = \frac{1}{2\pi} \cdot \sqrt{\frac{K}{m}} \qquad \text{Equation (1)}$$

In consequence, by giving a frequency of vibrations that should be dampened by the vibration-damping mechanism, namely, a vibration-damping frequency $f_0$, and a spring constant K/3 determined by the properties of elastic-member material of one of such insulators 11, as predetermined values, it is possible to calculate the mass m of the weight plate 10 using Equation (1).

Moreover, in the equivalent model of the vibration-damping mechanism, natural-vibration frequencies of translational vibration modes each on three axes of the X-axis, the Y-axis and the Z-axis that pass through the gravity-center position $W_2$, and natural-vibration frequencies of rotational vibration modes about the three principal axes of inertia that pass through the gravity-center position $W_2$, give always the same value without depending on the shape and area of the triangle connecting the three material particles 14a, 14b and 14c.

As to the point in which the equivalent model of the vibration-damping mechanism in FIG. 7 has such a characteristic such as aforementioned, the explanation will be made below comparing the model with another model in which the distance from the gravity-center position $W_2$ to each of the three material particles 14a, 14b and 14c is two times as large as that of the equivalent model of the vibration-damping mechanism in FIG. 7.

Because natural-vibration frequencies of translational vibration modes each on three axes of the X-axis, the Y-axis and the Z-axis that pass through the gravity-center position $W_2$ of the equivalent model of the vibration-damping mechanism in FIG. 7 are determined by a ratio between the mass m that is a total sum of an equally distributed mass to the three material particles 14a, 14b and 14c, and a total sum "K" of the three spring constants to each set of spring elements 15a, spring elements 15b, the spring elements 15c, the ratio does not change even when the distance from the gravity-center position $W_2$ to each of the three material particles 14a, 14b and 14c is made two-fold. Therefore, it can be easily understood that the natural-vibration frequencies of the translational vibration modes do not depend on placement positions of the three material particles 14a, 14b and 14c.

Meanwhile, because natural-vibration frequencies of rotational vibration modes each about the three principal axes of inertia that pass through the gravity-center position $W_2$ of the equivalent model of the vibration-damping mechanism are determined by the ratio between inertia moment and a rotational spring constant, and for example, when the distance from the gravity-center position $W_2$ to each of the three material particles 14a, 14b and 14c is made two-fold, inertia moment about the axis $P_2$ is made four-fold and also a rotational spring constant about the axis $P_2$ is made four-fold; thereby, even when the distance from the gravity-center position $W_2$ to each of the three material particles 14a, 14b and 14c is made two-fold, the ratio between the inertia moment and the rotational spring constant does not change. Therefore, it can be easily understood that the natural-vibration frequencies of the rotational vibration modes do not also depend on the placement positions of the three material particles 14a, 14b and 14c.

As described above, without depending on the placement positions of the three material particles 14a, 14b and 14c, the natural-vibration frequencies of the translational vibration modes each and the natural-vibration frequencies of the rotational vibration modes each give always the same value.

In consequence, by utilizing the characteristic of the equivalent model of the vibration-damping mechanism described above, the shape of the weight plate 10 is appropriately determined in such a condition that, when it is mounted on the drive chassis 1 by way of the insulators 11, natural-vibration frequencies of translational modes each of two orthogonal axes on the X-Y plane that pass through the gravity-center position $W_2$ of the weight plate 10, and natural-vibration frequencies of a rotational modes each about the axis $P_2$ that is parallel to the Z-axis and in the same way passes through the gravity-center position $W_2$, are made coincident with a so-called vibration-damping frequency $f_0$ that is the vibration frequency in which vibrations of the drive chassis 1 are required to be curbed.

In what follows, using FIG. 3, FIG. 6 and FIG. 7, the procedures to determine the shape of the weight plate 10 will be explained in more detail. The setting work for the shape of the weight plate 10 is performed by repeating modifications of the shape using three-dimensional CAD software. As for the software, used is I-DEAS (registered trademark) that is commercially-available three-dimensional CAD software produced by UGS PLM Solutions; however, it is not necessarily limited to the software, but generally-available three-dimensional CAD software that can calculate easily the gravity-center position and inertia moment may be used for.

Because there is a trend in which the higher a rotational speed of the optical disk 4, the larger vibrations of the drive chassis 1 become, a vibration-damping frequency $f_0$ is usually made coincident with a frequency corresponding to a maximum rotational speed of the optical disk 4, as already described above. For example, when the maximum rotational speed of the optical disk 4 is 6000 rpm, the vibration-damping frequency $f_0$ is set at 100 Hz.

Next, as for the spring constant of the insulators 11, a predetermined spring constant is given by selecting materials for the rubber to be used.

Next, using Equation (1), the mass m of the weight plate 10 is calculated from the vibration-damping frequency $f_0$ and a total sum "K" of the predetermined spring constants of three insulators 11, and the mass of a tentative shape being a starting point for evaluating the shape of the weight plate 10 to obtain the shape of the weight plate 10 is set as "m" on three-dimensional CAD data. As for the tentative shape, although it is necessary to satisfy dimensional constraints that allow the weight plate 10 finally obtained to be mounted in the disk apparatus, other than those can be freely given. Here, for example, the shape of the conventional weight plate 13 shown in FIG. 3 is presumed to be given firstly as the tentative shape. Hereinafter, presuming a premise that a value of the mass of such a weight plate will not be changed, the tentative shape is to be modified.

Next, the tentative shape of the weight plate 1.3 is changed on three-dimensional CAD data so that the gravity-center position $W_2$ of the equivalent model of the vibration-damping mechanism shown in FIG. 7, and the gravity-center position of the tentative shape of the weight plate 13 in FIG. 3 take the same position, and also inertia moment about the axis $P_2$ of the equivalent model of the vibration-damping mechanism shown in FIG. 7, and inertia moment about an axis that passes through the gravity-center position $W_1$ of the tentative shape of the weight plate 13 are made the same.

As described above, the tentative shape of the weight plate 13 is changed under the constraints described above, and then, the modifications of the tentative shape are completed at a time-point when, with respect to the equivalent model of the vibration-damping mechanism shown in FIG. 7, the gravity-center position of a modified tentative shape is the same as the gravity-center position $W_2$ of the equivalent model of the vibration-damping mechanism, so that an axis that passes through the gravity-center position of the modified tentative shape in directions-perpendicular to the plane of revolution of the optical disk 4 is made coincident with the axis $P_2$ of the equivalent model of the vibration-damping mechanism, and that inertia moment about an axis that passes through the gravity-center position of the modified tentative shape in directions perpendicular to the plane of revolution of the optical disk 4 is also made coincident with inertia moment about the axis $P_2$ of the equivalent model.

Upon completion of the work procedures described above, it is possible to obtain the shape of the weight plate 10 shown in FIG. 6 in Embodiment 1 according to the present invention.

That is to say, the weight plate 10 obtained by the work procedures described above has, when compared with the equivalent model of the vibration-damping mechanism shown in FIG. 7, the same mass m as a total sum of equally distributed masses each to three material particles of the equivalent model, and also the gravity-center position of the weight plate 10 takes the same gravity-center position $W_2$ as the gravity-center position of the equivalent model, whereby inertia moment about the axis $P_2$ of the weight plate 10 is the same as inertia moment about the axis $P_2$ of the equivalent model.

In the vibration-damping mechanism for the drive chassis 1 on which the weight plate 10 obtained as aforementioned is floatingly and movably supported in three respective predetermined positions of the drive chassis 1 by way of the three insulators 11, and therefore, natural-vibration frequencies of translational modes each on two orthogonal axes on the X-Y plane that pass through the gravity-center position $W_2$ of the weight plate 10, and natural-vibration frequencies of rotational modes each about the axis $P_2$ that is parallel to the Z-axis and in the same way passes through the gravity-center position $W_2$ are determined to be coincident with a so-called vibration-damping frequency $f_0$ that is the vibration frequency in which vibrations of the drive chassis 1 are required to be curbed, so that the vibrations of the drive chassis 1 can be substantially curbed even when the rotational center of the optical disk 4 and the gravity-center position $W_2$ of the weight plate 10 are largely shifted to each other in relation to the X-axis direction.

Note that, the work according to the setting procedures for the shape of the weight plate 10 explained in the above, can be usually completed in the order of several hours when carried out using generally-available three-dimensional CAD software by which the gravity-center position and inertia moment can be easily calculated. It is then needless to say that the shape of the weight plate 10 shown in. FIG. 6 that has been obtained according to such setting procedures is clearly different from the shape of the conventional weight plate 13 shown in FIG. 3.

Next, a vibration analysis relating to vibrations caused by the eccentricity of the gravity-center of the optical disk 4 has been carried out to evaluate a vibration-damping capability of the disk apparatus including the vibration-damping mechanism using the weight, plate 10 obtained by the setting procedures described above in Embodiment 1 according to the present invention, in a similar manner to the case with the conventional weight plate 13, giving the quantity of eccentricity in rotation to 5 g·mm as the term of eccentricity of the gravity-center of the optical disk 4.

In a similar manner to the evaluation of the conventional weight plate 13, used in the vibration analysis is ADAMS (registered trademark) that is commercially-available three-dimensional mechanism-analysis software produced by MSC Software Corporation.

Note that, although the parameters used for the vibration analysis are the same, excluding the parameters related to the shapes of the weight plate 10 and the weight plate 13, as those when the conventional weight plate 13 has been evaluated, the explanation will be made in more detail here.

In relation to the parameters used for the vibration analysis, a spring constant of the insulators 11 each is set at 7890 N/m, an attenuation coefficient of the insulators 11 each, 1.5 N·sec/m, the mass of the drive chassis 1 and components mounted thereon, 160 g (excluding the mass of the weight plate 10), a spring constant of the insulators 9 each, 10440 N/m, and an attenuation coefficient of the insulators 9 each, 14.0 N·sec/m.

In addition, it is presumed that the maximum rotational speed of the optical disk is 6000 rpm; thereby, a vibration-damping frequency $f_0$ has been set at 100 Hz.

The mass m of the weight plate 10 is calculated, using Equation (1), from a value of total sum "K" of spring. constants of the three insulators 11 (=7890 N/m by three times) described above and a value of the vibration-damping frequency $f_0$ (=100 Hz), so that 60 g is derived as the mass of the weight plate 10.

Figure 8:
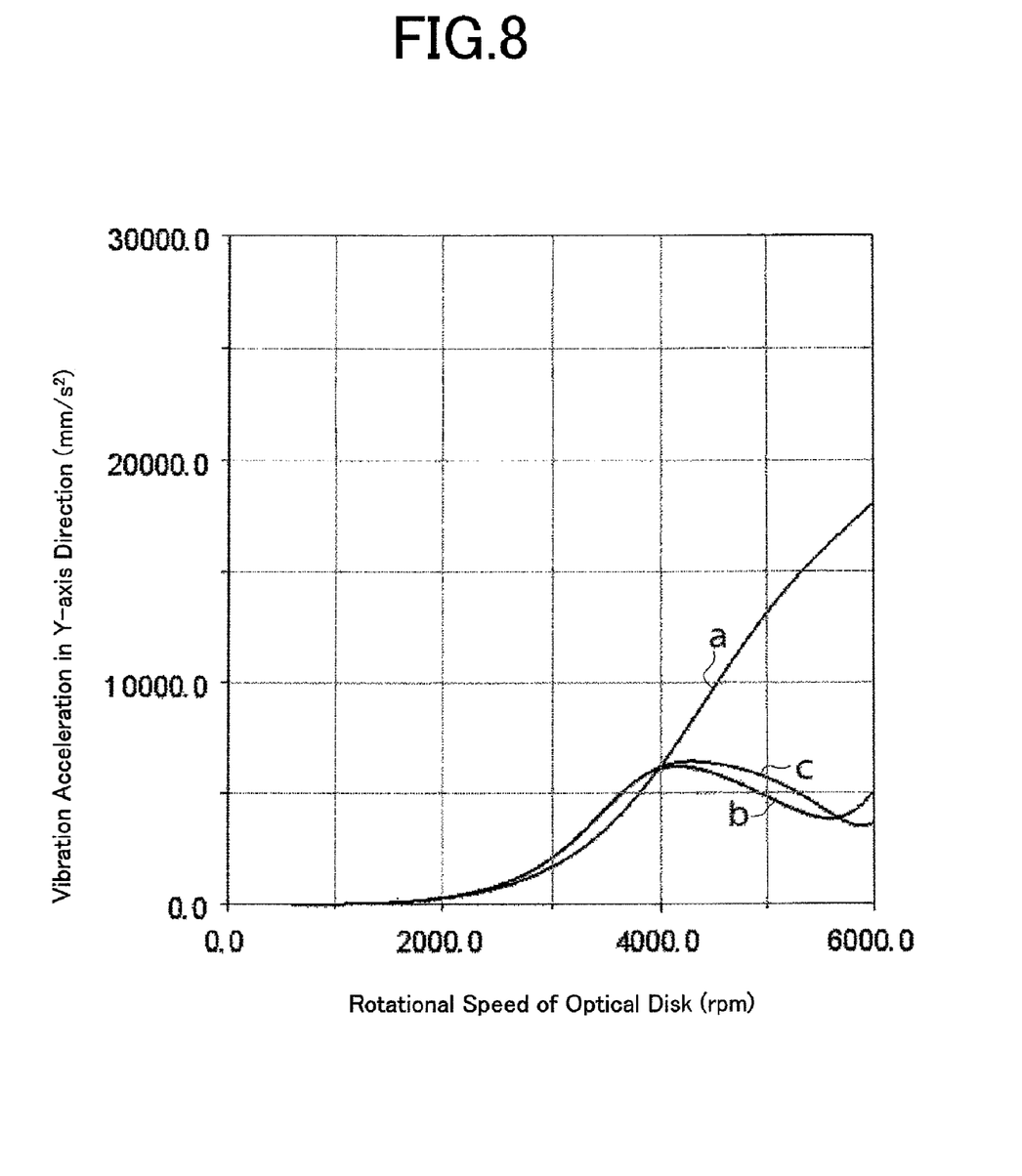
FIG. 8 is an evaluation diagram of vibration analysis showing the evaluation result of the vibration analysis in a Y-axis direction of the disk apparatus that includes the vibration-damping mechanism having the weight plate 10 mounted therefore in the disk apparatus in Embodiment 1 according to the present invention.

FIG. 8 is an evaluation diagram of vibration analysis showing the evaluation result of the vibration analysis in a Y-axis direction of the disk apparatus that includes the vibration-damping mechanism having the weight plate 10 mounted therefore in the disk apparatus in Embodiment 1 according to the present invention. Similarly to FIG. 4, the horizontal axis denotes a rotational speed of the optical disk, and the vertical axis, vibration acceleration of the drive chassis 1 in the Y-axis direction. In addition, the curve "a" indicates a case in which the vibration-damping mechanism is not provided, and the curve "b," a case including the vibration-damping mechanism with the conventional weight plate 13 mounted therein. Moreover, the curve "c" indicates a case including the vibration-damping mechanism with the weight plate 10 mounted therein in Embodiment 1 according to the present invention.

Now, as is known from FIG. 8, comparing the curve "b" with the curve "c" on the vibration acceleration in the Y-axis direction reveals no particular difference between the cases in the vibration-damping mechanism with the conventional weight plate 13 and in the vibration-damping mechanism with the weight plate 10 in Embodiment 1 according to the present invention, and therefore, vibrations at a high rotational speed are substantially curbed.

Figure 9:
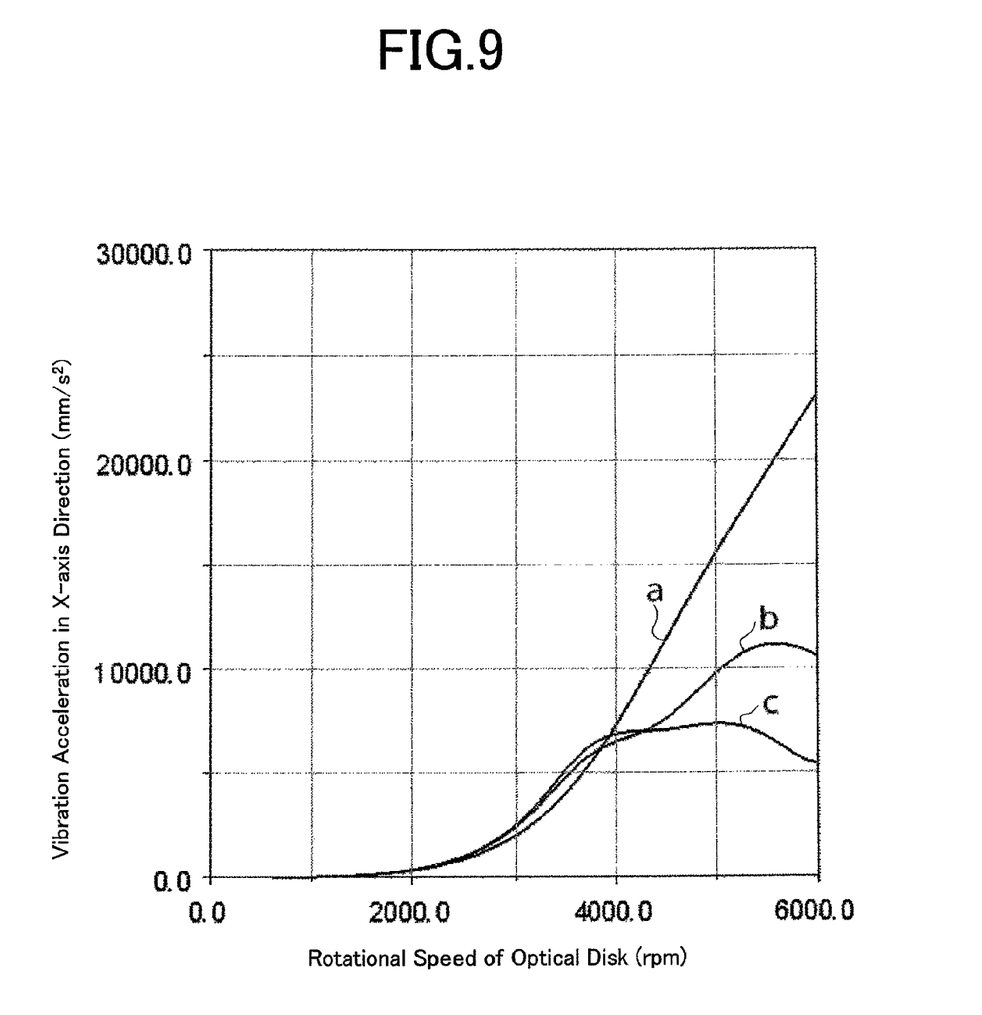
FIG. 9 is an evaluation diagram of vibration analysis showing the evaluation result of the vibration analysis in an X-axis direction of the disk apparatus that includes the vibration-damping mechanism having the weight plate 10 mounted therefore in the disk apparatus in Embodiment 1 according to the present invention.

On the other hand, FIG. 9 is an evaluation diagram of vibration analysis showing the evaluation result of the vibration analysis in the X-axis direction of the disk apparatus that includes the vibration-damping mechanism having the weight plate 10 mounted therefore in the disk apparatus in Embodiment 1 according to the present invention. Similarly to FIG. 5, the horizontal axis denotes a rotational speed of the optical disk, and the vertical axis, vibration acceleration of the drive chassis 1 in the X-axis direction. In addition, the curve "a" indicates a case in which the vibration-damping mechanism is not provided, and the curve "b," a case including the vibration-damping mechanism with the conventional weight plate 13 mounted therein. Moreover, the curve "c" indicates a case including the vibration-damping mechanism with the weight plate 10 mounted therein in Embodiment 1 according to the present invention.

Differing from the case in FIG. 8, as is known from FIG. 9, comparing the curve "b" with the curve "c" reveals that vibrations at a high rotational speed cannot be substantially curbed even when the vibration-damping mechanism with the conventional weight plate 13 mounted therein is provided. On the contrary, when the vibration-damping mechanism is used that has the weight plate 10 mounted in Embodiment 1 according to the present invention, the vibrations at the high rotational speed can be substantially curbed.

As described above, because the shape of the weight plate 10 is determined based on a vibration-damping frequency $f_0$ of the drive chassis 1, three respective predetermined positions of the drive chassis 1 at which the weight plate 10 is floatingly and movably supported on the drive chassis 1 by way of three insulators 11, and a predetermined spring constant of the three insulators 11 which are identical to each other, vibrations of the drive chassis 1 can be substantially curbed by making the disk apparatus include the vibration-damping mechanism for the drive chassis 1 supporting the weight plate 10 by way of the three insulators 11.

Moreover, it should be added that, when the shape of the weight plate 10 is to be defined, because the shape is determined based on the mass m of the weight plate 10 obtained from the vibration-damping frequency $f_0$ and the predetermined spring constant of the three insulators 11, and on inertia moment that is attributed to, as the axis of rotation, the axis $P_2$ perpendicular to the plane of revolution of the optical disk 4 and passing through the gravity-center position $W_2$ of the weight plate 10, and is obtained from an equally distributed mass m/3 in which the mass m of the weight plate 10 is equally divided by three that is the number of the insulators 11 and distributed to the three respective predetermined positions of the drive chassis 1, the vibrations of the drive chassis 1 can be substantially curbed by making the disk apparatus include the vibration-damping mechanism for the drive chassis 1 supporting the weight plate 10 by way of the three insulators 11.

Furthermore, it should be added that, because the shape of the weight plate 10 is determined so that, a plurality of natural-vibration modes of the vibration-damping mechanism for the drive chassis 1 including the three insulators 11 and the weight plate 10 includes a translational vibration mode corresponding to the mass m of the weight plate 10 at the gravity-center position $W_2$ of the weight plate 10 in two mutually orthogonal directions parallel to the main surface of the disk 4 and a rotational vibration mode corresponding to the mass 10 of the weight plate 10, about the axis $P_2$ passing through the gravity-center position $W_2$ of the weight plate 10 as the axis of rotation, and each of individual natural-vibration frequencies attributed to the translational vibration mode and the rotational vibration mode is made approximately coincident with a vibration-damping frequency, the vibrations of the drive chassis 1 can be substantially curbed by making the disk apparatus include the vibration-damping mechanism for the drive chassis 1 supporting the weight plate 10 by way of the three insulators 11.

In addition, by making an arrangement to determine, based on a maximum rotational speed of the optical disk 4, a so-called vibration-damping frequency that is the vibration frequency in which vibrations of the drive chassis 1 are required to be curbed, large vibrations can be effectively curbed because the higher a rotational speed is, the larger the vibrations of the drive chassis 1 become.

By the way, the disk apparatus first performs reading such content information recorded on the innermost side of the optical disk 4, usually, for example, when the disk 4 is to be played back. In addition, parameter-setting for a servo system that accommodates the difference in reflectance to the optical disk 4, and determination of the type of disk, are also performed by reading information recorded on the innermost side of the disk 4. That is, as initial movements immediately after the optical disk 4 is loaded into the disk apparatus, the information on the innermost side of the optical disk 4 is read, and at this position, the optical disk 4 rotates at a maximum rotational speed.

In the disk apparatus according to the present invention, because a vibration curbing effect is the most significant at the maximum rotational speed, these initial movements can be stably performed so that it is possible to avoid such a problem in which the optical disk 4 is ejected as an error without completing the initial movements.

As to a disk apparatus using BD (Blue-ray Disc), it is not only required to make higher in recording density, but also to realize speed-enhancement for recording digital signal and/or playing that back, resulting in requirements of a faster rotational speed of the optical disk 4 in comparison with a conventional DVD. In the disk apparatus according to the present invention, a significant effect can be obtained for the disk apparatus of BD because the vibration curbing effect is the most significant at the maximum rotational speed.

Embodiment 2.

In the vibration-damping mechanism of the disk apparatus in Embodiment 1 according to the present invention, the weight plate 10 is made floatingly and movably supported on the drive chassis 1 by way of the three insulators 11; however, similar effects can also be obtained when the number of the insulators 11 is taken to four or more.

For example, when a weight plate is supported on such a drive chassis 1 by way of four of such insulators 11, each of the four insulators 11 is placed in four predetermined positions of the drive chassis 1. In an equivalent model of a vibration-damping mechanism, four material particles are placed in the four predetermined positions in place of the ones shown in FIG. 7, and, after having obtained the mass of the weight plate from a vibration-damping frequency and a predetermined spring constant in which the four insulators 11 have, the mass is to be equally distributed to the four material particles.

Next, based on the equally distributed mass m/4 in which the mass m of the weight plate is equally divided by four that is the number of predetermined positions and distributed to the four predetermined positions of the drive chassis 1, inertia moment is obtained that is attributed to, as the axis of rotation, an axis perpendicular to the main surface of the disk 4 and passing through the gravity-center position of the weight plate, and therefore, based on the mass of the weight plate and the inertia moment, the shape of the weight plate can be appropriately determined by repeating modifications of a tentative shape using three-dimensional CAD software.

As described above, even when the number of the insulators that are elastic members to floatingly and movably support the weight plate on the drive chassis is taken to four or more, vibrations of the drive chassis 1 can be substantially curbed by providing a disk apparatus with the vibration-damping mechanism for the drive chassis 1 having the weight plate.

What is claimed is:

1. A disk apparatus, comprising:
    a motor for rotationally driving a discoid recording medium;
    a record-playback unit for recording a digital signal onto and/or playing back a recorded digital signal from the discoid recording medium;
    a drive chassis on which said motor and said record-playback unit are fastened;
    elastic members placed in at least three respective predetermined positions of said drive chassis; and
    a weight plate floatingly and movably supported on said drive chassis by way of said elastic members; wherein
    the shape of said weight plate is determined based on:
        the mass of said weight plate obtained from a predetermined vibration-damping frequency, a spring constant of the elastic members, and the number of predetermined positions, and
        an inertia moment, about an axis of rotation perpendicular to the main surface of the discoid recording medium and passing through the gravity-center position of said weight plate, obtained based on an equally distributed mass in which the mass of said weight plate is divided by the number of the predetermined positions and distributed thereto;
    a plurality of natural-vibration modes of a vibration-damping mechanism for the drive chassis including the at least three elastic members and the weight plate includes:
        a translational vibration mode corresponding to the mass of said weight plate at the gravity-center position of said weight plate in two mutually orthogonal directions parallel to the main surface of the discoid recording medium, and
        a rotational vibration mode corresponding to the mass of said weight plate, about an axis passing through the gravity-center position of said weight plate as said axis of rotation,
    the shape of said weight plate is determined by making each of individual natural-vibration frequencies attributed to the translational vibration mode and the rotational vibrational mode approximately coincident with the predetermined vibration-damping frequency, the predetermined vibration-damping frequency is set based on a maximum rotational speed of the discoid recording medium; and said elastic members are attached to said weight plate and said chassis, and disposed therebetween, at said predetermined positions.

2. A method comprising:

fastening a motor and a record-playback unit on a drive chassis of a disk apparatus, the motor being used to rotationally drive a discoid recording medium, the record-playback unit being used to record a digital signal onto and/or play back a recorded digital signal from the discoid recording medium;

placing elastic members in at least three respective predetermined positions of said drive chassis; and floatingly and movably supporting a weight plate on said drive chassis by way of said elastic members; wherein:

the shape of said weight plate is determined based on:
  the mass of said weight plate obtained from a predetermined vibration-damping frequency, a spring constant of the elastic members, and the number of predetermined positions, and
  an inertia moment, about an axis of rotation perpendicular to the main surface of the discoid recording medium and passing through the gravity-center position of said weight plate, obtained based on an equally distributed mass in which the mass of said weight plate is divided by the number of the predetermined positions and distributed thereto;

a plurality of natural-vibration modes of a vibration-damping mechanism for the drive chassis including the at least three elastic members and the weight plate includes:
  a translational vibration mode corresponding to the mass of said weight plate at the gravity-center position of said weight plate in two mutually orthogonal directions parallel to the main surface of the discoid recording medium, and
  a rotational vibration mode corresponding to the mass of said weight plate, about an axis passing through the gravity-center position of said weight plate as said axis of rotation, the shape of said weight plate is determined by making each of individual natural-vibration frequencies attributed to the translational vibration mode and the rotational vibrational mode approximately coincident with the predetermined vibration-damping frequency, the predetermined vibration-damping frequency is set based on a maximum rotational speed of the discoid recording medium; and said elastic members are attached to said weight plate and said chassis, and disposed therebetween, at said predetermined positions.

* * * * *